(12) United States Patent
Manchineni et al.

(10) Patent No.: US 9,361,125 B2
(45) Date of Patent: *Jun. 7, 2016

(54) DYNAMIC RECONFIGURATION OF QUEUE PAIRS

(71) Applicant: International Business Machines Corporation, Armonk, NY (US)

(72) Inventors: Harikrishna K. Manchineni, Hyderabad (IN); Sanket Rathi, Hyderabad (IN); Prashant Sreedharan, Hyderabad (IN)

(73) Assignee: International Business Machines Corporation, Armonk, NY (US)

(*) Notice: Subject to any disclaimer, the term of this patent is extended or adjusted under 35 U.S.C. 154(b) by 171 days.

This patent is subject to a terminal disclaimer.

(21) Appl. No.: 14/147,880

(22) Filed: Jan. 6, 2014

(65) Prior Publication Data

US 2015/0100771 A1    Apr. 9, 2015

Related U.S. Application Data

(63) Continuation of application No. 14/049,247, filed on Oct. 9, 2013.

(51) Int. Cl.
  *G06F 9/44* (2006.01)
(52) U.S. Cl.
  CPC ............ *G06F 9/4411* (2013.01); *G06F 9/4401* (2013.01)
(58) Field of Classification Search
  CPC ...................................................... G06F 9/505
  See application file for complete search history.

(56) References Cited

U.S. PATENT DOCUMENTS

| 6,260,068 B1 * | 7/2001 | Zalewski | G06F 9/5077 707/999.01 |
| 8,219,712 B2 | 7/2012 | Riddoch et al. | |
| 8,291,148 B1 | 10/2012 | Shah et al. | |

(Continued)

FOREIGN PATENT DOCUMENTS

| EP | 2363996 A1 | 9/2011 |
| WO | 2011131400 A1 | 10/2011 |

OTHER PUBLICATIONS

Palladino, "Investigating Data Throughput and Partial Dynamic Reconfiguration in a Commodity FPGA Cluster Framework", Rochester Institute of Technology, Aug. 2011, <https://ritdml.rit.edu/bitstream/handle/1850/14523/NPalladinoThesis8-2011.pdf?sequence=1>.

(Continued)

*Primary Examiner* — Kim Huynh
*Assistant Examiner* — Joshua Neveln
(74) *Attorney, Agent, or Firm* — Adolph Bohnstedt; David M. Quinn

(57) ABSTRACT

Dynamic reconfiguration of queue pairs in a data processing system is provided. A device driver determines whether a dynamic CPU reconfiguration has added one or more CPUs to the data processing system, wherein the data processing system comprises a number of CPUs and a number of queue pairs. Responsive to the dynamic CPU configuration adding one or more CPUs, the device driver allocates a portion of a memory corresponding to a queue pair, wherein each queue pair comprises a receive queue and a transmit queue, programs a receive side scaling mechanism in a network adapter to allow for dynamic insertion of a processing engine associated with the queue pair, and enables transmit tuple hashing to the queue pair.

6 Claims, 6 Drawing Sheets

(56) References Cited

U.S. PATENT DOCUMENTS

| | | | |
|---|---|---|---|
| 8,413,143 B2 | 4/2013 | Cardona et al. | |
| 2010/0332869 A1* | 12/2010 | Hsin | G06F 1/3203 713/320 |
| 2011/0265095 A1 | 10/2011 | Cardona et al. | |
| 2012/0210337 A1 | 8/2012 | Cardona et al. | |

OTHER PUBLICATIONS

Vonnahme, et al., "Dynamic reconfiguration of real-time network interfaces", Proceedings of the 4th International Conference on Parallel Computing in Electrical Engineering (PARELEC 2004), Dresden, Germany, Sep. 8-10, 2004, pp. 376-379.

KVM, "Multiqueue virtio-net", <http://www.linux-kvm.org/page/Multiqueue>.

Linux, "Scaling in the Linux Networking Stack", <http://lxr.free-electrons.com/source/Documentation/networking/scaling.txt>.

"Sun™ Dual Gigabit Ethernet and Dual SCSI/P Adapter Installation and User's Guide", Sun Microsystems, Inc., Part No. 817-4339-10, Jan. 2004, Revision A, Copyright 2004 Sun Microsystems, Inc., pp. 1-10, <www.sun.com>.

VMWare, "RSS and multiqueue support in Linux driver for VMXNET3 (2020567)", pp. 1-6, <http://kb.vmware.com/selfservice/microsites/search.do?language=en_US&cmd=displayKC&externalid=2020567>.

U.S. Appl. No. 14/049,247, entitled "Dynamic Reconfiguration of Queue Pairs", filed Oct. 9, 2013.

* cited by examiner

DYNAMIC RECONFIGURATION OF QUEUE PAIRS

CROSS REFERENCE TO RELATED APPLICATION

This application is a continuation of prior U.S. patent application Ser. No. 14/049,247, filed Oct. 9, 2013.

FIELD OF THE INVENTION

The present disclosure relates generally to the field of data processing, and more particularly to dynamic reconfiguration of queue pairs.

BACKGROUND OF THE INVENTION

Receive side scaling (RSS) is a network driver technology that enables efficient distribution of network receive processing across multiple CPUs in multiprocessor systems. A RSS component in a network adapter filters the incoming data stream using various hash algorithms into processing engines or queue pairs. Each queue pair comprises a transmit queue and a receive queue. The number of queue pairs in use may vary.

With increased virtualization, the number of central processor units (CPUs) in a system is not fixed and can vary dynamically. Dynamic CPU reconfiguration can dynamically add or remove CPUs in a virtual system without interruption of input or output.

SUMMARY

Embodiments of the present invention disclose a method, computer program product, and system for dynamic reconfiguration of queue pairs. A device driver determines whether a dynamic CPU reconfiguration has added one or more CPUs to the data processing system, wherein the data processing system comprises a number of CPUs and a number of queue pairs. Responsive to the dynamic CPU configuration adding one or more CPUs, the device driver allocates a portion of a memory corresponding to a queue pair, wherein each queue pair comprises a receive queue and a transmit queue, programs a receive side scaling mechanism in a network adapter to allow for dynamic insertion of a processing engine associated with the queue pair, and enables transmit tuple hashing to the queue pair.

DETAILED DESCRIPTION

Various illustrative embodiments of the present invention provide a mechanism for dynamic reconfiguration of queue pairs for dynamic central processor unit (CPU) reconfiguration with no interruption in performance or service. Embodiments of the present invention recognize that virtualized computing environments may include one or more CPUs and one or more adapter. Further recognized is that each queue pair (QP) may comprise a transmit queue and a receive queue. Further recognized is that a CPU may be added to or removed from a virtualized computing environment by dynamic configuration (DR).

Embodiments of the present invention recognize that modern adapters may provide multiple packet QPs. These adapters may be able to perform parallel network data processing via the use of multiple transmit/receive queues (QPs) per interface. The ingress or receive traffic may be tuple hashed by the adapter to the appropriate QP and associated interrupt for operating system processing. The egress or transmit traffic may be tuple hashed by the device driver for delivery to the adapter. Adapters and device drivers may allocate one or more QPs. Embodiments of the present invention provide a mechanism for dynamically reconfiguring QPs in response to dynamic reconfiguration of CPUs.

Figure 1:
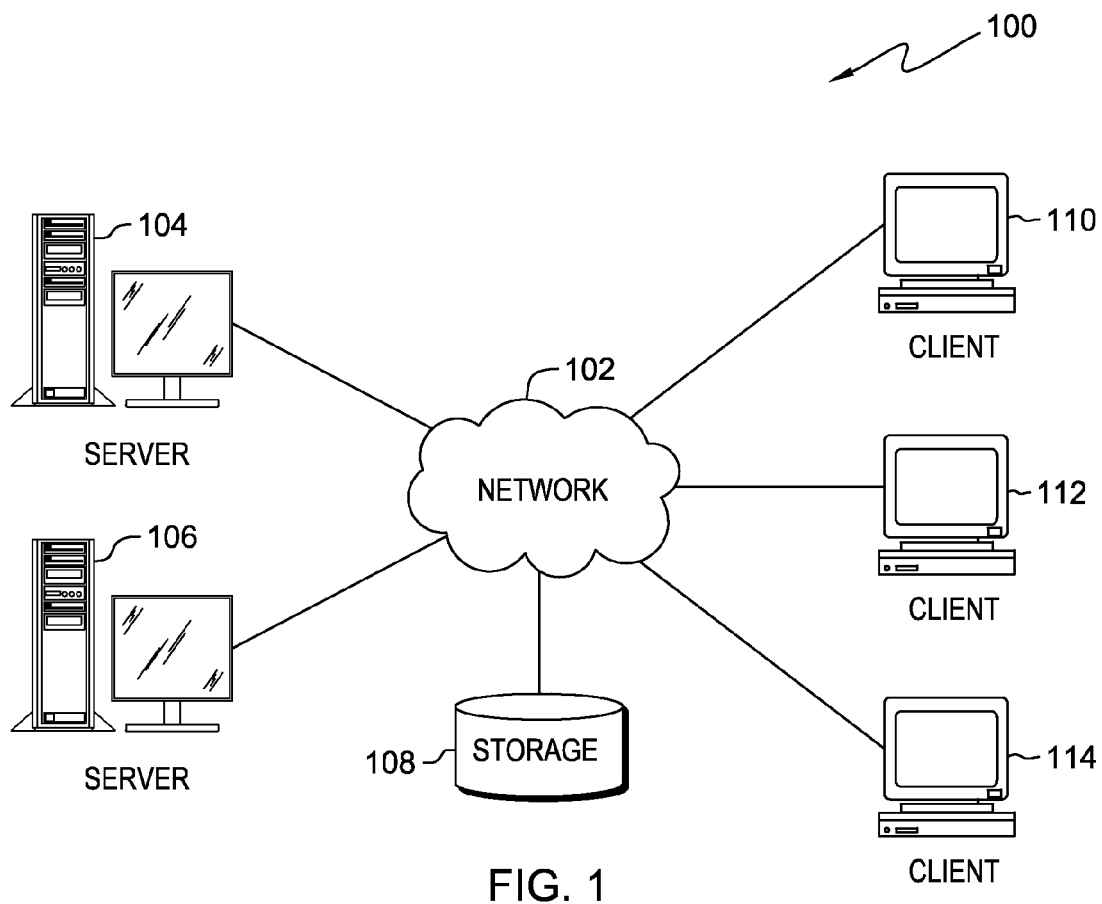
FIG. 1 depicts a pictorial representation of an example distributed data processing system in which aspects of the illustrative embodiments may be implemented.
Figure 2:
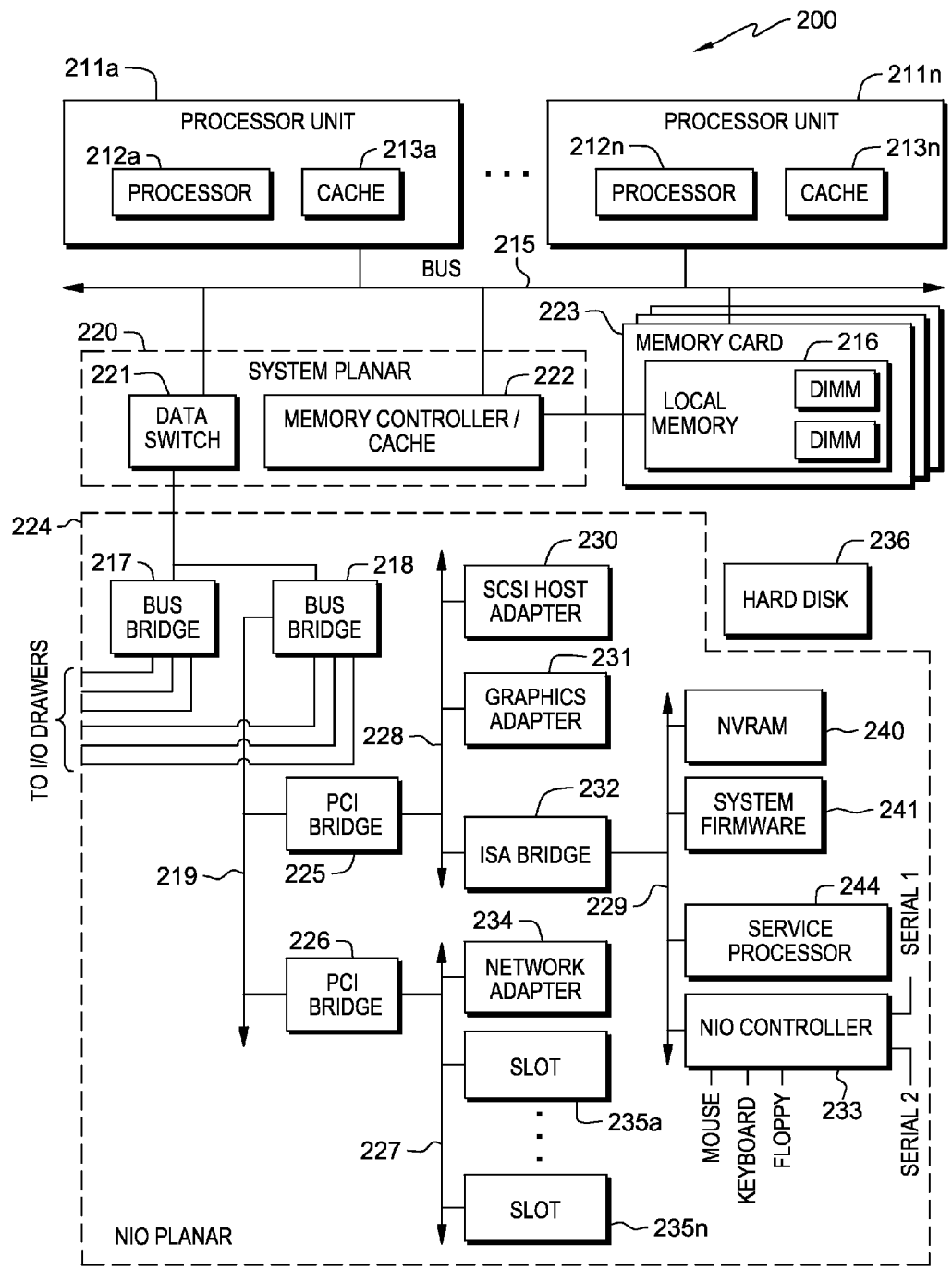
FIG. 2 depicts a block diagram of a data processing system with which aspects of the illustrative embodiments may be utilized.
Figure 3:
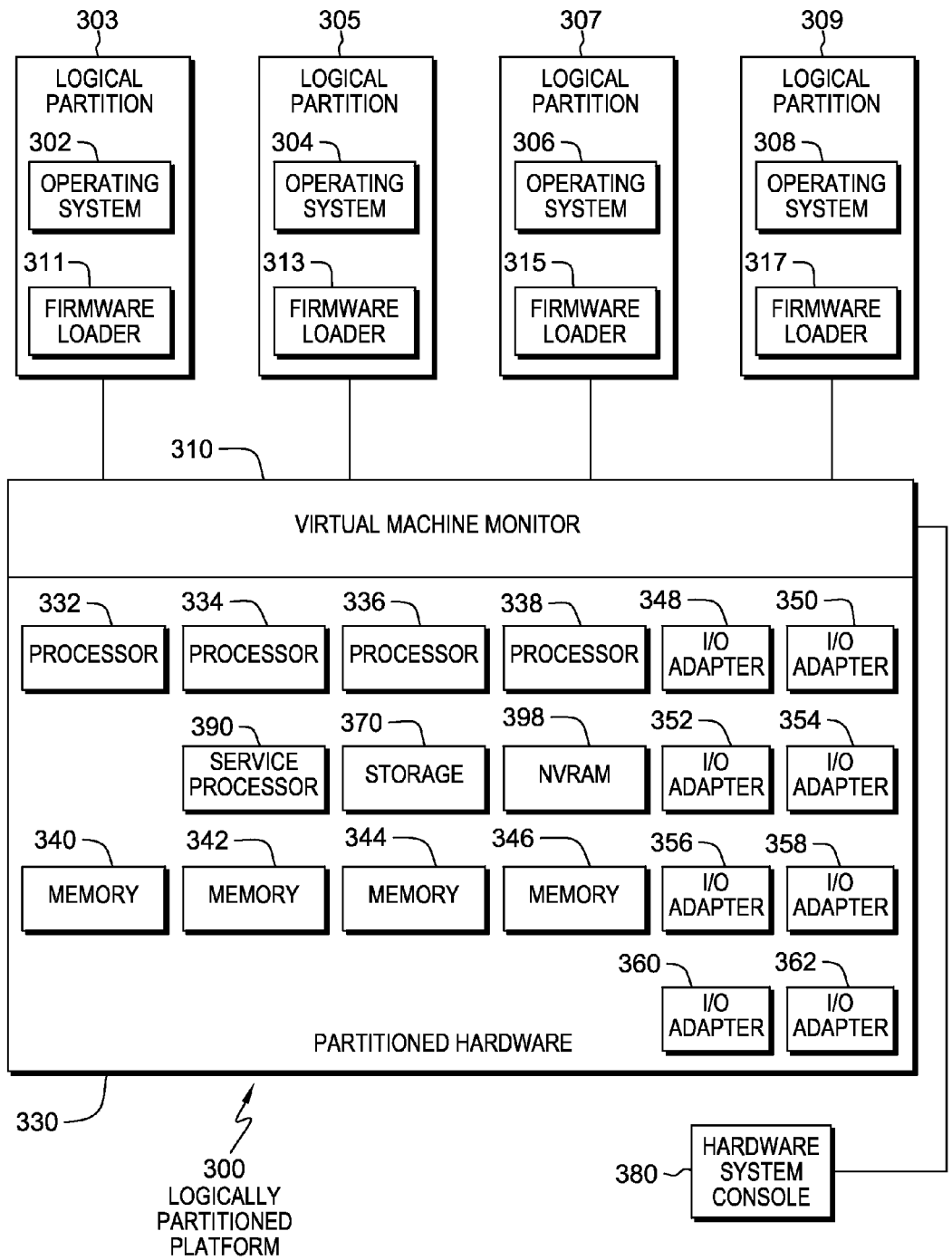
FIG. 3 depicts a block diagram of an exemplary logically partitioned platform in which the illustrative embodiments may be implemented.

Thus, the various embodiments of the present invention may be utilized in many different types of data processing environments including a distributed data processing environment, a single data processing device, or the like. In order to provide a context for the description of the specific elements and functionality of the various embodiments, FIGS. 1-3 are provided hereafter as example environments in which aspects of the various embodiments may be implemented. While the description following FIGS. 1-3 will focus primarily on a single data processing device implementation of a mechanism that provides dynamic reconfiguration of queue pairs, this is only an example and is not intended to state or imply any limitation with regard to the features of the present invention. To the contrary, the various embodiments are intended to include distributed data processing environments and embodiments in which dynamic reconfiguration of queue pairs may be provided for dynamically reconfigured CPUs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. The term "computer-readable storage media" does not include computer-readable signal media.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java is a registered trademark of Oracle in the United States, other countries, or both), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

With reference now to the Figures and in particular with reference to FIGS. 1-3, example diagrams of data processing environments are provided in which illustrative embodiments of the present invention may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a functional block diagram illustrating a distributed data processing environment, in accordance with an embodiment of the present invention. Distributed data processing system 100 may include a network of computers in which aspects of the illustrative embodiments may be implemented. Distributed data processing system 100 contains at least one network 102, which is the medium used to provide communication links between various devices and computers connected together within distributed data processing system 100. Network 102 may include connections, such as wire, wireless communication links, or fiber optic cables.

In the depicted example, distributed data processing system 100 includes server computer 104, storage unit 108, and clients 110, 112, and 114, all interconnected over network 102. In various embodiments, clients 110, 112, and 114 may each respectively be a laptop computer, a tablet computer, a netbook computer, a personal computer (PC), a desktop computer, a personal digital assistant (PDA), a smart phone, or any programmable electronic device capable of communicating with server computer 104 via network 102.

Server computers 104 and 106 may each be a laptop computer, a tablet computer, a netbook computer, a personal computer (PC), a desktop computer, a personal digital assistant (PDA), a smart phone, or any programmable electronic device capable of communicating with each other server computer 104 and 106, clients 110, 112, and 114 and storage unit 108 via network 102.

In the depicted example, server computer 104 provides data, such as boot files, operating system images, and applications to clients 110, 112, and 114. Clients 110, 112, and 114 are clients to server computer 104 in the depicted example. Distributed data processing system 100 may include additional servers, clients, and/or other devices not shown.

In an exemplary embodiment, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, distributed data processing system 100 may also be implemented to include a number of different types of networks, such as for example, an intranet, a local area network (LAN), a wide area network (WAN), or the like, or a combination thereof. In general, network 102 can be any combination of connections and protocols that will support communications between server computer 104, storage unit 108, and clients 110, 112, and 114. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

In the illustrative embodiments, a computer architecture is implemented as a combination of hardware and software. The software part of the computer architecture may be referred to as microcode or millicode. The combination of hardware and software creates an instruction set and system architecture that the rest of the computer's software operates on, such as Basic Input/Output System (BIOS), Virtual Machine Monitors (VMM), Hypervisors, applications, etc. The computer architecture created by the initial combination is immutable to the computer software (BIOS, etc), except through defined interfaces which may be few.

FIG. 2 depicts a block diagram of a data processing system with which aspects of the illustrative embodiments may be utilized. As shown, data processing system 200 includes processor units 211*a*-211*n*. Each of processor units 211*a*-211*n* includes a processor and a cache memory. For example, processor unit 211*a* contains processor 212*a* and cache memory 213*a*, and processor unit 211*n* contains processor 212*n* and cache memory 213*n*.

Processor units 211*a*-211*n* are connected to main bus 215. Main bus 215 supports system planar 220 that contains processor units 211*a*-211*n* and memory cards 223. System planar 220 also contains data switch 221 and memory controller/cache 222. Memory controller/cache 222 supports memory cards 223 that include local memory 216 having multiple dual in-line memory modules (DIMMs).

Data switch 221 connects to bus bridge 217 and bus bridge 218 located within native I/O (NIO) planar 224. As shown, bus bridge 218 connects to peripheral components interconnect (PCI) bridges 225 and 226 via system bus 219. PCI bridge 225 connects to a variety of I/O devices via PCI bus 228. As shown, hard disk 236 may be connected to PCI bus 228 via small computer system interface (SCSI) host adapter 230. Graphics adapter 231 may be directly or indirectly connected to PCI bus 228. PCI bridge 226 provides connections for external data streams through network adapter 234 and adapter card slots 235*a*-235*n* via PCI bus 227.

Industry standard architecture (ISA) bus 229 connects to PCI bus 228 via ISA bridge 232. ISA bridge 232 provides interconnection capabilities through NIO controller 233 having serial connections Serial 1 and Serial 2. A floppy drive connection, keyboard connection, and mouse connection are provided by NIO controller 233 to allow data processing system 200 to accept data input from a user via a corresponding input device. In addition, non-volatile RAM (NVRAM) 240, connected to ISA bus 229, provides a non-volatile memory for preserving certain types of data from system disruptions or system failures, such as power supply problems. System firmware 241 is also connected to ISA bus 229 for implementing the initial Basic Input/Output System (BIOS) functions. Service processor 244 connects to ISA bus 229 to provide functionality for system diagnostics or system servicing.

The operating system (OS) is stored on hard disk 236, which may also provide storage for additional application software for execution by a data processing system. NVRAM 240 is used to store system variables and error information for field replaceable unit (FRU) isolation. During system startup, the bootstrap program loads the operating system and initiates execution of the operating system. To load the operating system, the bootstrap program first locates an operating system kernel image on hard disk 236, loads the OS kernel image into memory, and jumps to an initial address provided by the operating system kernel. In an embodiment, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. Data processing system 200 may be, for example, a stand-alone system or part of a network such as a local-area network (LAN) or a wide-area network (WAN). As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

FIG. 3 depicts a block diagram of an exemplary logically partitioned platform in which the illustrative embodiments may be implemented. The hardware in logically partitioned platform 300 may be implemented, for example, using the hardware of data processing system 200 in FIG. 2.

Logically partitioned platform 300 includes partitioned hardware 330, operating systems 302, 304, 306, 308, and virtual machine monitor 310. Operating systems 302, 304, 306, and 308 may be multiple copies of a single operating system or multiple heterogeneous operating systems simultaneously run on logically partitioned platform 300. These operating systems may be implemented, for example, using z/OS® (z/OS is a registered trademark of IBM Corporation in the United States, other countries, or both), which is designed to interface with a virtualization mechanism, such as partition management firmware, e.g., a hypervisor. z/OS is used only as an example in these illustrative embodiments. Of course, other types of operating systems, such as OS/400® (OS/400 is a registered trademark of IBM Corporation in the United States, other countries, or both), AIX® (AIX is a registered trademark of IBM Corporation in the United States, other countries, or both), and Linux® (Linux is a registered trademark of Linus Torvalds in the United States, other countries, or both), may be used depending on the particular implementation. Operating systems 302, 304, 306, and 308 are located in logical partitions 303, 305, 307, and 309, respectively.

Hypervisor software is an example of software that may be used to implement platform (in this example, virtual machine monitor 310) and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logically partitioned platform 300 may also make use of PowerVM® (Power VM is a registered trademark of IBM Corporation in the United States, other countries, or both), Active Memory™ (Active Memory is a trademark of IBM Corporation in the United States, other countries, or both)

Sharing, which is an IBM PowerVM advanced memory virtualization technology that provides system memory virtualization capabilities to IBM Power Systems™ (Power Systems is a trademark of IBM Corporation in the United States, other countries, or both), allowing multiple logical partitions to share a common pool of physical memory. The physical memory of IBM Power Systems may be assigned to multiple logical partitions either in a dedicated or shared mode. A system administrator has the capability to assign some physical memory to a logical partition and some physical memory to a pool that is shared by other logical partitions. A single partition may have either dedicated or shared memory. Active Memory Sharing may be exploited to increase memory utilization on the system either by decreasing the system memory requirement or by allowing the creation of additional logical partitions on an existing system.

Logical partitions 303, 305, 307, and 309 also include partition firmware loaders 311, 313, 315, and 317. Partition firmware loaders 311, 313, 315, and 317 may each be implemented using IPL or initial boot strap code, IEEE-1275 Standard Open Firmware, and runtime abstraction software (RTAS), which is available from International Business Machines Corporation.

When logical partitions 303, 305, 307, and 309 are instantiated, a copy of the boot strap code is loaded into logical partitions 303, 305, 307, and 309 by virtual machine monitor 310. Thereafter, control is transferred to the boot strap code with the boot strap code then loading the open firmware and RTAS. The processors associated or assigned to logical partitions 303, 305, 307, and 309 are then dispatched to the logical partition's memory to execute the logical partition firmware.

Partitioned hardware 330 includes a plurality of processors 332-338, a plurality of system memory units 340-346, a plurality of input/output (I/O) adapters 348-362, and storage unit 370. In various embodiments, processors 332-338 may each be, for example, microprocessors, network processors, etc. Each of processors 332-338, memory units 340-346, NVRAM storage 398, and I/O adapters 348-362 may be assigned to one of multiple logical partitions 303, 305, 307, and 309 within logically partitioned platform 300, each of which corresponds to one of operating systems 302, 304, 306, and 308.

Virtual machine monitor 310 performs a number of functions and services for logical partitions 303, 305, 307, and 309 to generate and enforce the partitioning of logical partitioned platform 300. Virtual machine monitor 310 is a firmware implemented virtual machine identical to the underlying hardware. Thus, virtual machine monitor 310 allows the simultaneous execution of independent OS images 302, 304, 306, and 308 by virtualizing all the hardware resources of logical partitioned platform 300.

Service processor 390 may be used to provide various services, such as processing of platform errors in logical partitions 303, 305, 307, and 309. Service processor 390 may also act as a service agent to report errors back to a vendor, such as International Business Machines Corporation. Operations of the different logical partitions may be controlled through a hardware system console 380. Hardware system console 380 is a separate data processing system from which a system administrator may perform various functions including reallocation of resources to different logical partitions.

The illustrative embodiments provide for a device driver to monitor dynamic reconfiguration kernel services of an operating system (OS). In response to a dynamic CPU reconfiguration, the device driver determines whether a CPU has been added or removed from the environment. If the dynamic CPU reconfiguration adds a CPU, the device driver dynamically allocates a queue pair (QP) (i.e., a transmit/receive pair). If the dynamic CPU reconfiguration removes a CPU, the kernel thread quiesces a QP and removes the QP. In an embodiment, the kernel thread quiesces a QP by waiting until the workload of the QP completes.

In some embodiments, the device driver monitors the dynamic reconfiguration kernel services of the OS by registering a handle with the dynamic reconfiguration kernel services, such that the OS invokes the handle in response to a dynamic reconfiguration CPU operation. The device driver also creates a kernel thread, which sleeps until woken by the handle. The handle wakes the kernel thread in response to the OS invoking the handle. In response to waking, the kernel thread determines whether a CPU has been added or removed from the environment. If a CPU has been added, the kernel thread dynamically allocates a queue pair (QP) (i.e., a transmit/receive pair) and returns to sleep. If a CPU has been removed, the kernel thread quiesces the QP of the CPU and/or redirects the queued workload to another CPU, removes the QP, and returns to sleep.

Figure 4:
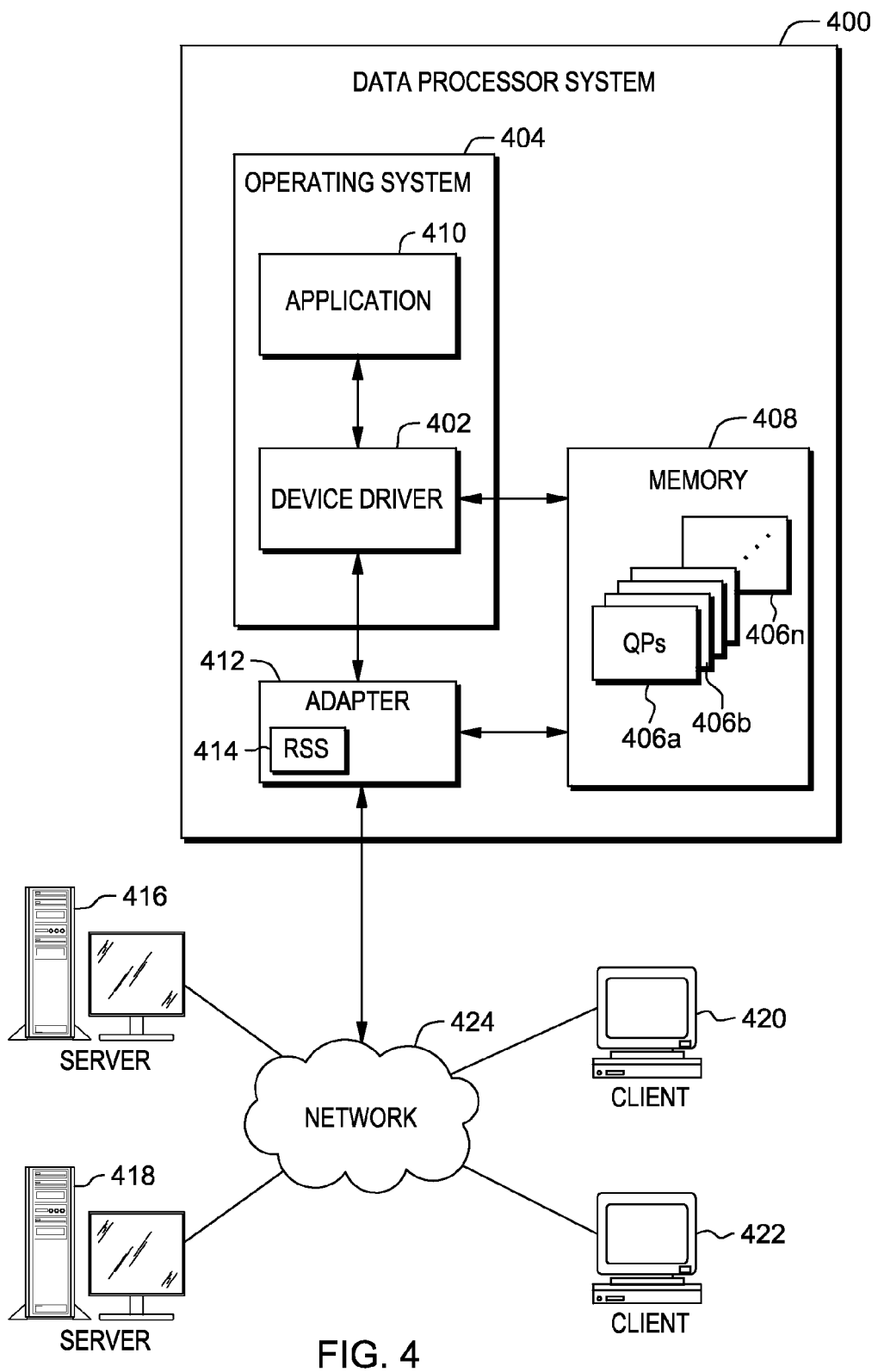
FIG. 4 depicts an exemplary implementation of a mechanism that provides dynamic reconfiguration of queue pairs in accordance with an embodiment of the present invention.

FIG. 4 depicts an exemplary implementation of a mechanism that provides dynamic reconfiguration of queue pairs for dynamic CPU reconfiguration in accordance with an embodiment of the present invention. The elements shown in FIG. 4 may be implemented in hardware, software, or any combination of hardware and software. In an embodiment, the elements of FIG. 4 are implemented as software executing on one or more processors of one or more data processing devices or systems. In an embodiment, data processing system 400 includes the hardware of data processing system 200 in FIG. 2.

Data processing system 400 comprises device driver 402 within operating system 404. Device driver 402 provides one or more queue pairs 406a-406n in memory 408 for use by application 410 and network adapter 412. While the illustrative embodiment only illustrates one device driver 402, one application 410, and one network adapter 412, one of ordinary skill in the art may recognize that data processing system 400 may comprise a plurality of device drivers, a plurality of applications, and a plurality of network adapters within data processing system 400. Further, operating system 404 may be a virtualized operating system, or one of a plurality of virtualized operating systems, operating within data processing system 400.

When operating system 404 initializes, operating system 404 configures and initializes device driver 402. Device driver 402 inventories the number of CPUs within data processing system 400 available to device driver 402 by, for example, sending a query to the kernel of operating system 404. Device driver 402 allocates a queue pair of QPs 406a-406n, each of which may comprise a number of receive descriptors/buffers and a number of transmit descriptors/buffers, within memory 408.

Device driver 402 starts network adapter 412 so that traffic may be transmitted to network adapter 412. During operation, device driver 402 receives traffic that is to be transmitted to network adapter 412 and sends the traffic onto network adapter 412 for delivery. Network adapter 412 then sends the transmit traffic onto a device, such as server 416, server 418, client 420, client 422, or the like, via network 424. Conversely, when network adapter 412 receives traffic that is to be transmitted to device driver 402 from a device, such as server 416, server 418, client 420, client 422, or the like, via network 424, network adapter 412 raises an interrupt for processing by operating system 404 and the traffic is sent to device driver 402. Each of queue pairs 406a-406n, which may be further allocated as described below, have its own associated receive interrupt.

Device driver 402 continuously monitors the kernel of operating system 404 for dynamic CPU reconfiguration. Device driver 402 may include a handle and a kernel thread, wherein kernel thread sleeps until woken by the handle, which the device driver 402 registers with the dynamic reconfiguration kernel services of operating system 404. Operating system 404 invokes the handle in response to invoking the dynamic reconfiguration kernel service for dynamic CPU reconfiguration. The handle wakes the kernel thread in response to operating system 404 invoking the handle.

Device driver 402 dynamically reconfigures QPs 406a-406n in response to dynamic CPU reconfiguration. Device driver 402 (or, for example, the kernel thread of device driver 402) dynamically reconfigures QPs 406a-406n in response to the handle waking the kernel thread. In response to the addition of a CPU by dynamic CPU reconfiguration, device driver 402 dynamically allocates and initializes an additional one of QPs 406a-406n. Device driver 402 programs receive side scaling (RSS) mechanism 414 within network adapter 412 to allow for dynamic insertion of the additional one of queue pairs 406a-406n. Device driver 402 enables transmit tuple hashing to the additional one of queue pairs 406a-406n. Receive tuple hashing and processing by network adapter 412 automatically enables through the programming of RSS mechanism 414. Device driver 402 continues to add ones of queue pairs 406a-406n, if not already allocated and initialized, for each CPU added by dynamic CPU reconfiguration, until all available ones of queue pairs 406a-406n are consumed or until queue pairs 406a-406n equal a number of CPUs in data processing system 400. Device Driver 402 also reprograms RSS mechanism 414 in network adapter 412 to allow for dynamic insertion of an additional processing engine each time a new one of queue pairs 406a-406n is added, as well as enables transmit tuple hashing to the new one of queue pairs 406a-406n.

In response to the removal of a CPU by dynamic CPU reconfiguration, device driver 402 may dynamically reprogram RSS mechanism 414 in network adapter 412 to allow for deletion of an allocated one of queue pairs 406a-406n. Device driver 402 disables transmit tuple hashing to the deleted one of queue pairs 406a-406n. Once the deleted one of queue pairs 406a-406n quiesces, device driver 402 removes the deleted one of queue pairs 406a-406n thereby freeing up the memory used by the deleted one of queue pairs 406a-406n. As with the enable of receive tuple hashing in network adapter 412, receive tuple hashing and processing by network adapter 412 automatically disables through the reprogramming of RSS mechanism 414.

Thus, the illustrative embodiments provide mechanisms for providing dynamic reconfiguration of queue pairs via dynamic reconfiguration of the underlying hardware for dynamic central processor unit (CPU) reconfiguration with no interruption in performance or service. As dynamic CPU reconfiguration adds CPUs from a data processing environment, the device driver dynamically allocates an additional queue pair for each added CPU. As dynamic CPU reconfiguration removes a CPU from the data processing environment, the device driver dynamically removes a queue pair from the data processing environment. This cycle repeats itself when additional CPUs are added or removed.

Figure 5:
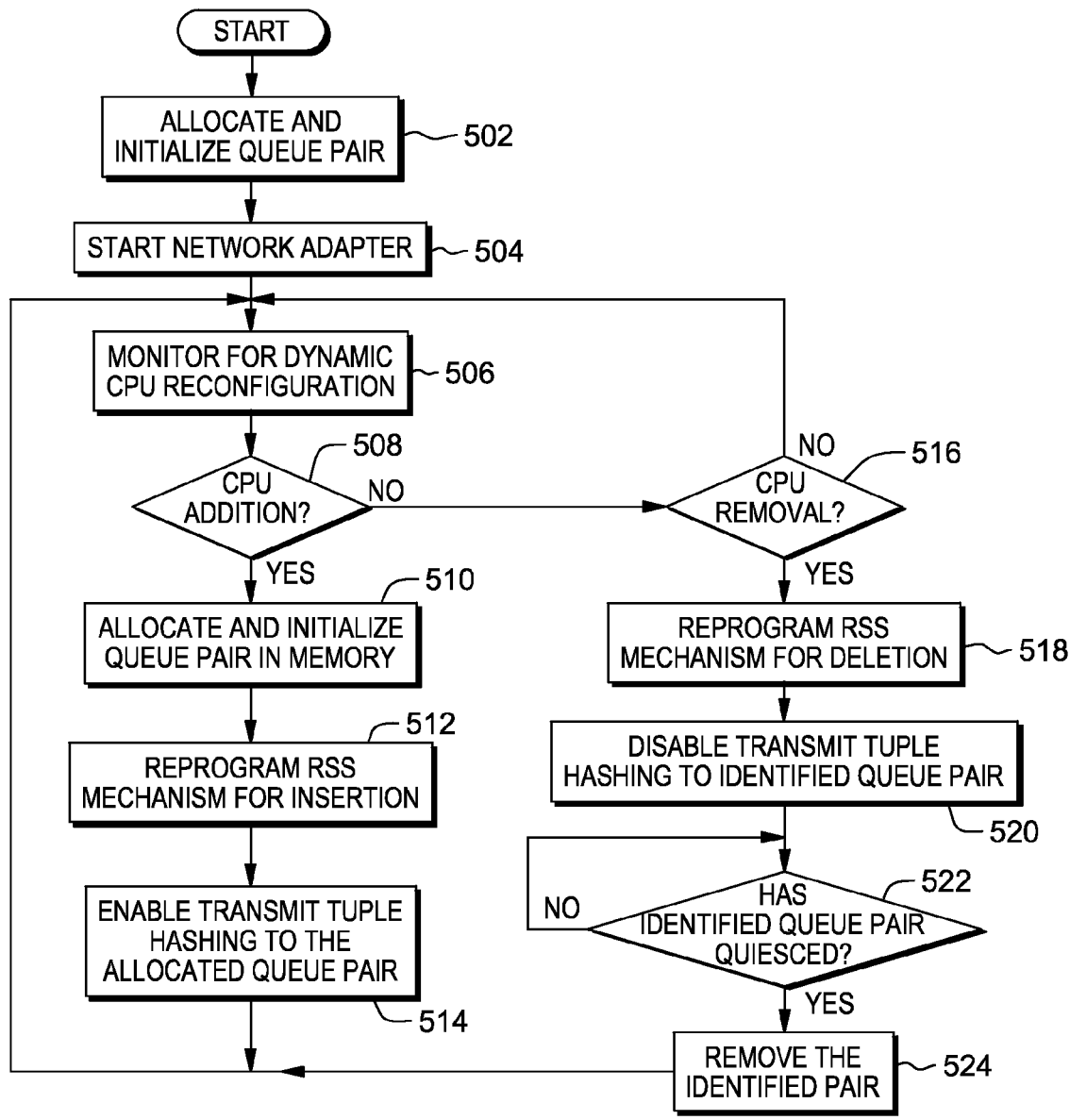
FIG. 5 depicts a flowchart outlining example operations of dynamic reconfiguration of queue pairs, in accordance with an illustrative embodiment.

Referring now to FIG. 5, this Figure provides a flowchart outlining example operations of providing dynamic reconfiguration of queue pairs for dynamic CPU reconfiguration in accordance with an illustrative embodiment. As the operation begins, a configured and initialized device driver 402 allocates and initializes at least one queue pair (step 502). Device driver 402 may allocate and initialize one queue pair for each CPU of at least one CPU. Device driver 402 starts the network adapter so that traffic may be transmitted to the network adapter (step 504). Device driver 402 continuously monitors an operating system for dynamic CPU reconfiguration (step 506).

In response to a dynamic CPU reconfiguration, device driver 402 determines whether the dynamic CPU configuration added a CPU (decision 508). If device driver 402 determines that the dynamic CPU configuration has added a CPU (decision 508, "YES" branch), then device driver 402 dynamically allocates and initializes an additional queue pair in the memory (step 510). Device driver 402 programs/reprograms the RSS mechanism in the network adapter to allow for dynamic insertion of an additional processing engine (step 512) and device driver 402 enables transmit tuple hashing to the newly allocated queue pair (step 514), with the operation returning to step 506 thereafter.

If device driver 402 determines that the dynamic CPU configuration has not added a CPU (decision 508, "NO" branch), device driver 402 determines whether a CPU has been removed by the dynamic CPU reconfiguration (decision 516). If at decision 516 device driver 402 determines that a CPU has not been removed, then the operation returns to step 506. If at decision 516 device driver 402 determines that the dynamic CPU reconfiguration has removed a CPU, then device driver 402 may dynamically reprogram the RSS mechanism in the network adapter to allow for deletion of an allocated queue pair (step 518). Device driver 402 disables transmit tuple hashing to an identified queue pair (step 520). Device driver 402 determines whether workload to the identified queue pair has quiesced (decision 522). If at decision 522 device driver 402 determines that the workload to the identified queue pair fails to have quiesced (decision 522, "NO" branch), then the operation returns to decision 522. If at decision 522 device driver 402 determines that the workload to the identified queue pair has quiesced (decision 522, "YES" branch), device driver 402 removes the identified queue pair from memory (step 524) thereby freeing up the memory used by the identified queue pair. The operation returns to step 506.

Figure 6:
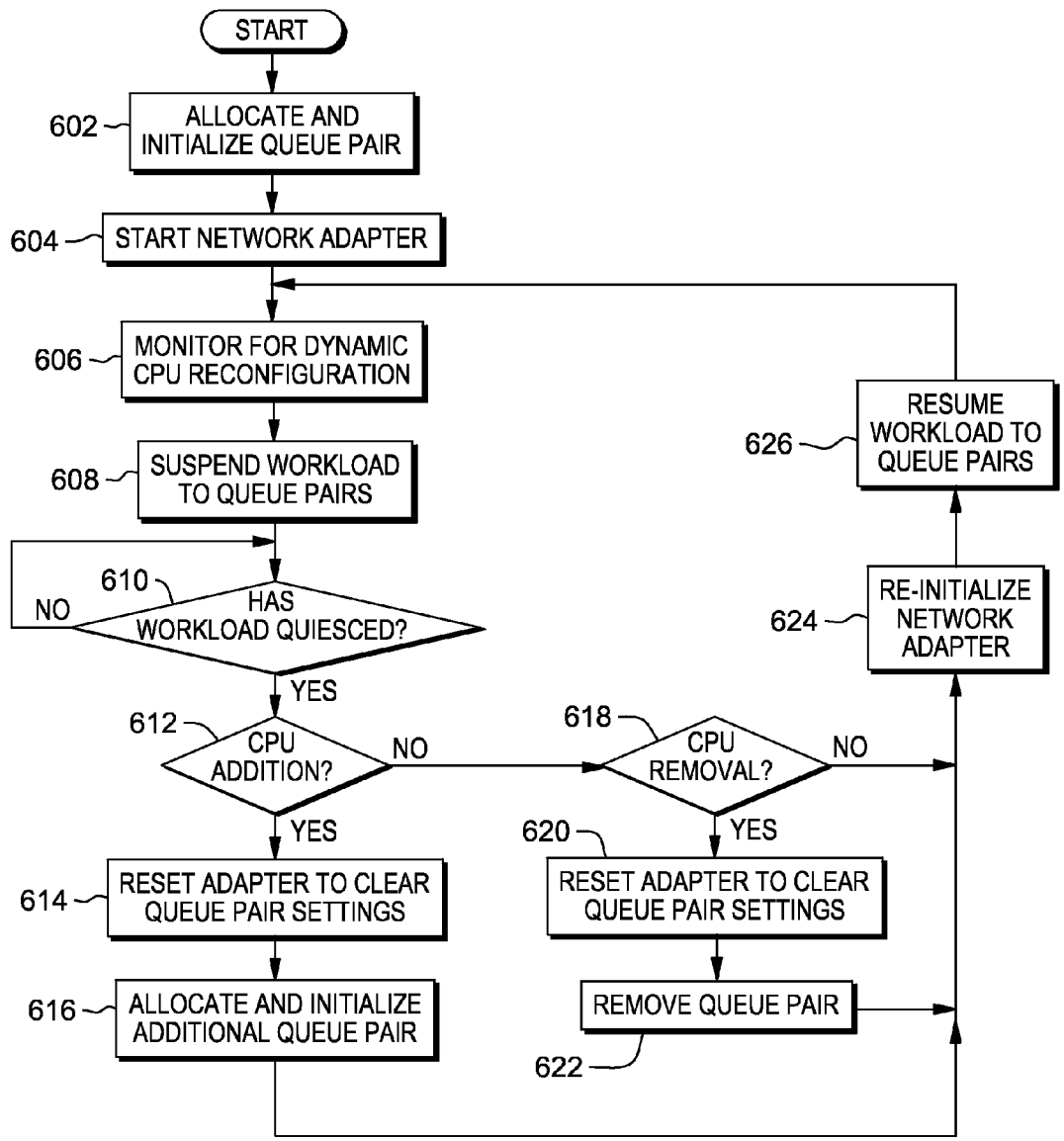
FIG. 6 depicts a flowchart outlining example operations of dynamic reconfiguration of queue pairs, in accordance with an illustrative embodiment.

Referring now to FIG. 6, this Figure provides a flowchart outlining example operations of providing dynamic reconfiguration of queue pairs for dynamic CPU reconfiguration in accordance with an illustrative embodiment. In the illustrative embodiment, the hardware utilized does not support dynamic reconfiguration of the queue pairs. Thus, the illustrative embodiment depicted in FIG. 6 provides a method for dynamic reconfiguration of queue pairs without hardware support.

As the operation begins, a configured and initialized device driver 402 allocates and initializes at least one queue pair (step 602). Device driver 402 may allocate and initialize one queue pair for each CPU of at least one CPU. Device driver 402 starts the network adapter so that traffic may be transmitted to the network adapter (step 604). Device driver 402 continuously monitors an operating system for dynamic CPU reconfiguration (step 606).

In response to a dynamic CPU reconfiguration, device driver 402 suspends workload to the allocated queue pairs (step 608). Device driver 402 may retain traffic for the receive queue in a receive ring of device driver 402 and traffic for the transmit queue in a virtualized transmit queue of device driver 402. Thus, no new workload traffic flows to the queue pairs while the workload is suspended.

Device driver 402 determines whether the allocated queue pairs have quiesced (decision 610). If at decision 610 device driver 402 determines that the queue pairs have fail to have quiesced (decision 610, "NO" branch), then the operation returns to decision 610. If at decision 610 device driver 402 determines that the allocated queue pairs have quiesced (decision 610, "YES" branch), device driver 402 determines whether the dynamic CPU configuration added a CPU (decision 612). If device driver 402 determines that the dynamic CPU configuration has added a CPU (decision 612, "YES" branch), then device driver 402 resets the adapter to clear the current queue pair settings (step 614). Device driver 402 allocates and initializes an additional queue pair in the memory (step 616), which becomes a queue pair of the allocated queue pairs. If device driver 402 determines that the dynamic CPU configuration has not added a CPU (decision 612, "NO" branch), device driver 402 determines whether a CPU has been removed by the dynamic CPU reconfiguration (decision 618). If at decision 618 device driver 402 determines that a CPU has not been removed (decision 618, "NO" branch), then the operation proceeds to step 624 without affecting the allocated queue pairs. If at decision 618 device driver 402 determines that the dynamic CPU reconfiguration has removed a CPU (decision 618, "YES" branch), device driver 402 resets the adapter to clear the current queue pair settings (step 620). Device driver 402 removes (i.e., de-allocates) a queue pair of the allocated queue pairs (step 622).

Device driver 402 re-initializes the network adapter (step 624) with the new number of queue pairs, which may include a queue pair allocated and initialized in step 616 or may exclude a queue pair removed in step 622. Device driver 402 resumes workload to the allocated queue pairs (step 626) and returns to step 606 thereafter.

It is understood that many variations of the illustrative embodiments are possible. In some embodiments, the dynamic CPU reconfiguration is performed in response to user criteria. The user criteria may be received as user input. The user criteria may specify adding or removing one or more CPUs.

In some embodiments, the device driver determines whether dynamic CPU reconfiguration added or removed a CPU by storing a previous CPU count, determining a current CPU count, and comparing the current CPU count to the previous CPU count.

In some embodiments, the device driver may determine that dynamic CPU reconfiguration added or removed a number of CPUs (e.g., a plurality of CPUs). For example, the device driver may determine that the number of CPUs exceeds the number of queue pairs (or vice versa). In response, the device driver may allocate and initialize a queue pair for each CPU added and/or the device driver may remove a queue pair for each removed CPU.

In some embodiments, the device driver may register a handle with the dynamic reconfiguration kernel services of the operating system. The operating system invokes the handle in response to invoking the dynamic reconfiguration kernel services. The device driver may create a kernel thread, which sleeps until woken by the handle in response to the operating system invoking the handle. The kernel thread can dynamically reconfigure queue pairs in response to dynamic CPU reconfiguration. The device driver may accomplish some or all of its described functionality using one or more such handles and kernel threads.

In some embodiments, the queue pair the device driver removes in response to determining that a dynamic CPU reconfiguration removed a CPU is the queue pair of a plurality of allocated queue pairs which had the lowest workload relative to the other queue pairs of the plurality of allocated queue pairs. In such embodiments, the device driver collects workload statistics across the allocated queue pairs to determine the workload of each queue pair workload. The workload statistics may include parameters such as transmit/receive bytes per second, a number of transmit/receive interrupts per second, or a number of packets on a transmit/receive queue. In embodiments without hardware support for dynamic reconfiguration of queue pairs (e.g., the illustrative embodiment discussed in connection with FIG. 6), the device driver may collect the workload statistics prior to suspending the workload.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for providing dynamic reconfiguration of queue pairs via dynamic reconfiguration of the underlying hardware for dynamic central processor unit (CPU) reconfiguration with no interruption in performance or service. As dynamic CPU reconfiguration adds CPUs from a data processing environment, the device driver dynamically allocates additional an additional queue pair for each added CPU. As dynamic CPU reconfiguration removes a CPU from the data processing environment, the device driver dynamically removes a queue pair of the data processing environment. This cycle repeats itself when additional CPUs are added or removed.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   determining, by one or more processors, whether a dynamic central processor unit (CPU) reconfiguration has added one or more first CPUs to a data processing system by invoking a kernel thread that is configured to determine whether the dynamic CPU reconfiguration has added the one or more first CPUs to the data processing system; and
   responsive to a determination that the dynamic CPU configuration has added the one or more first CPUs:
      allocating, by the one or more processors, a first portion of memory corresponding to one or more first queue pairs, wherein each of the one or more first queue pairs includes a first receive queue and a first transmit queue;
      programming, by the one or more processors, a first receive side scaling mechanism in a network adapter to allow for dynamic insertion of one or more first processing engines associated with the one or more first queue pairs; and
      enabling, by the one or more processors, transmit tuple hashing to the one or more first queue pairs.

2. The method of claim 1, wherein invoking the kernel thread further comprises:
   registering, by the one or more processors, a handle with a dynamic reconfiguration service of an operating system kernel; and
   responsive to the operating system kernel invoking the handle, waking, by the one or more processors, the kernel thread.

3. The method of claim 1, further comprising:
   determining, by the one or more processors, that a first number of CPUs of the data processing system exceeds a second number of queue pairs of the data processing system and, in response:
      allocating, by the one or more processors, a second portion of memory corresponding to one or more second queue pairs;
      programming, by the one or more processors, a second receive side scaling mechanism in the network adapter to allow for dynamic insertion of one or more second processing engines associated with the one or more second queue pairs; and
      enabling, by the one or more processors, transmit tuple hashing to the one or more second queue pairs.

4. The method of claim 1, further comprising:
   determining, by the one or more processors, whether the dynamic CPU reconfiguration has removed one or more second CPUs from the data processing system; and
   responsive to a determination that the dynamic CPU reconfiguration has removed the one or more second CPUs:
      programming, by the one or more processors, a third receive side scaling mechanism in the network adapter to allow for deletion of one or more third queue pairs;
      disabling, by the one or more processors, transmit tuple hashing to the one or more third queue pairs;
      determining, by the one or more processors, whether a workload to the one or more third queue pairs has quiesced; and
      responsive to a determination that the workload to the one or more third queue pair has quiesced, removing, by the one or more processors, the one or more third queue pairs from a third portion of memory.

5. The method of claim 4, further comprising:
   responsive to the workload to the one or more third queue pairs failing to quiesce, waiting, by the one or more processors, for the workload to the one or more third queue pairs to quiesce before removing the one or more third queue pairs from the third portion of memory.

6. The method of claim 4, further comprising:
   determining, by the one or more processors, that a third number of queue pairs of the data processing system exceeds a fourth number of CPUs of the data processing system and, in response:
   programming, by the one or more processors, a fourth receive side scaling mechanism in the network adapter to allow for deletion of one or more fourth queue pairs;
   disabling, by the one or more processors, transmit tuple hashing to the one or more fourth queue pairs;
   determining, by the one or more processors, whether a workload to the one or more fourth queue pairs has quiesced; and
   responsive to a determination that the workload to the one or more fourth queue pairs has quiesced, removing, by the one or more processors, the one or more fourth queue pairs from a fourth portion of memory.

* * * * *